Figure 1:
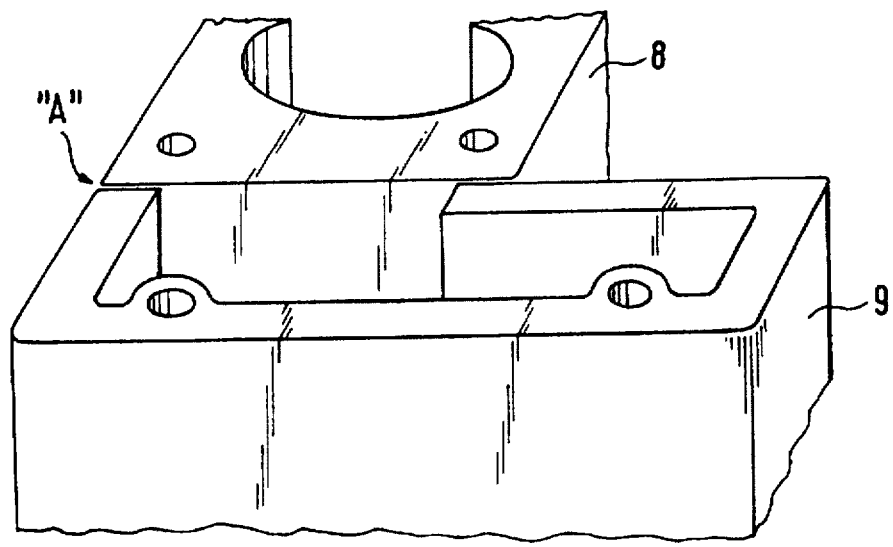

United States Patent [19]
Weiss et al.

[11] Patent Number: 5,727,791
[45] Date of Patent: Mar. 17, 1998

[54] CYLINDER HEAD GASKET FOR SEALING UNEVEN SURFACES HAVING RESERVOIR FILLED WITH PLASTIC PASTE-LIKE SEALANT AND METHOD OF FORMING THE SAME

[75] Inventors: Alfred Weiss; Wilfried Erb, both of Neu-Ulm, Germany

[73] Assignee: REINZ-Dichtungs-GmbH, Neu-Ulm, Germany

[21] Appl. No.: 714,892

[22] Filed: Sep. 17, 1996

[30] Foreign Application Priority Data

Sep. 20, 1995 [DE] Germany ............ 195 34 962.8

[51] Int. Cl.$^6$ ............................................. F16J 15/14
[52] U.S. Cl. ............................... 277/1; 277/235 B
[58] Field of Search ................ 277/72 FM, 233, 277/235 B

[56] References Cited

U.S. PATENT DOCUMENTS

| | | | |
|---|---|---|---|
| 3,837,657 | 9/1974 | Farnam et al. | 277/1 |
| 4,099,725 | 7/1978 | Wolters | 277/1 |
| 4,830,698 | 5/1989 | Decore et al. | 277/235 B |
| 4,832,349 | 5/1989 | Kawai et al. | 277/1 |
| 5,004,249 | 4/1991 | Grosch et al. | 277/235 B |
| 5,024,863 | 6/1991 | Gibbon | 277/235 B |
| 5,033,189 | 7/1991 | Desverchere et al. | 277/1 |
| 5,275,420 | 1/1994 | Rodenkirch et al. | 277/1 |
| 5,511,518 | 4/1996 | Jain et al. | 277/235 B |
| 5,544,901 | 8/1996 | Kubouchi et al. | 277/235 B |

FOREIGN PATENT DOCUMENTS

| | | | |
|---|---|---|---|
| 63954 | 2/1992 | Japan | 277/235 B |
| 280645 | 10/1993 | Japan | 277/235 B |
| 346173 | 12/1993 | Japan | 277/1 |
| 272765 | 9/1994 | Japan | 277/235 B |
| 2004602 | 4/1979 | United Kingdom | 277/235 B |
| 2212868 | 8/1989 | United Kingdom | 277/235 B |

*Primary Examiner*—Scott Cummings
*Attorney, Agent, or Firm*—Marshall & Melhorn

[57] ABSTRACT

The invention relates to a cylinder head gasket made of metallic material for internal combustion engines with components flanged laterally on to the engine block, which can reliably seal over a lengthy period of time even critical seal gaps in the region of additional components flanged on to the engine block. For this purpose, in the region of the gap between the engine block and/or cylinder head and the flanged-on component(s) there is in the cylinder head gasket at least one opening which communicates with at least one reservoir containing a plastic sealant mass.

22 Claims, 3 Drawing Sheets

CYLINDER HEAD GASKET FOR SEALING UNEVEN SURFACES HAVING RESERVOIR FILLED WITH PLASTIC PASTE-LIKE SEALANT AND METHOD OF FORMING THE SAME

The invention relates to a metallic single- or multi-layer cylinder head seal.

In the region of components flanged on to the engine block, which must be sealed off by the cylinder head gasket in the direction of the cylinder head and of the engine block, for example on the timing gear housing, when single- or multi-layer metallic seals are used problems occur due to their low deformability, which is caused by height differences in the gap at the flanged-on components. These height differences cannot be simply compensated for by the sealing material and for example an undesired emergence of oil or cooling water can occur in areas of the motor, which cause damage or negative influences at that point. Particularly critical are areas in which a portion of the seal gap has to be sealed in a vertical direction.

A cylinder head gasket is known from German Patent DE 43 37 758 C1, in which, in the region of the gap to be sealed, there are present openings radiating out from the lower seal surface, into which one or a plurality of T-shaped elastomeric bodies are inserted and are there held fast in a form-locking manner, and which project over the underside of the cylinder head gasket in the unassembled condition. This projection is intended to ensure a reliable seal in the assembled condition purely through the resilience of the elastomeric body and the pressure exerted by the cylinder head.

However, during a period of operation, and taking into account the temperature to which they are exposed, elastomers are subject to a certain degree of ageing so that the resilience and the sealing capacity can be lost at least in part over a lengthy period of operation. Moreover, elastomers resistant to oils or coolant additives must be used. In addition the use of such elastomeric bodies presumes that they are adapted to the shape dictated by the seal gap and within certain limits, so that a sufficient surface seal is achieved at all points. This becomes particularly problematic when the seal gap or its upper edge reveals geometric discontinuities.

There is further known from German Laid-Open Publication DE 44 26 792 A1 a flat metal gasket in which a plastically deformable seal material is coated at one side in pockets therewith. In this case the plastically deformable seal material in the pockets is open to the outside, which entails in particular problems in transport and storage. In this case in particular silicone, which in the real sense is not plastically deformable, is intended to be used. In a stacked form it can occur that the seal mass may be prematurely pressed out of the pocket or escape therefrom, or may adhere to seals. In order to prevent this, a temporarily-applied cover is provided for which an additional working step is necessary in manufacture and for its removal in assembly. No adaptation to various shapes of seal gap is provided.

It is therefore the object of the invention to improve a metallic cylinder head gasket in such a way that even critical seal gaps in the region of additional components flanged on to the engine block may be reliably sealed off over a lengthy period of time.

This object is achieved according to the invention for the device by the characterising part of patent claim 1, and for the method in claims 11 and 12. Advantageous developments and further designs of the solution according to the invention will be apparent in use of the features contained in the secondary claims.

By means of the design of the cylinder head gasket in the region of the gap which occurs between the actual engine block and a flanged-on component, for example the housing for the valve timing gear, it is ensured over a long period that no liquids can pass from one direction into the other over the seal gap. In this respect it is particularly advantageous to house a plastic and paste-like sealant mass in at least one reservoir which is connected to openings through which the plastic and paste-like sealant mass can emerge during assembly (mounting and clamping of the cylinder head) and can seal the seal gap. The quantity of plastic sealant mass contained in the reservoir or reservoirs is in this respect so calculated that the entire seal gap, particularly in the critical areas in which at least partly a vertical seal is necessary, is sealed off from the component and from the cylinder head. For this purpose the upper side of the cylinder head gasket may be raised in the region of the reservoir or reservoirs, so that during assembly the cylinder head presses on this raised area or on the raised areas, and the plastic sealant mass is pressed through the openings into the seal gap.

The openings may for example be in the form of longitudinal grooves, which extend over the entire area to be sealed, and which are for example connected directly or through ducts with the reservoir(s). Instead of the longitudinal groove, any optional form may also be selected, which is adapted to the shape of the gap to be sealed (meandering, elliptical, oval among others). The shape should also be locally correspondingly adapted to the requirement of sealant mass necessary for the seal.

They may also themselves however be duct-shaped and provided at regular intervals with openings through which the plastic sealant mass can emerge and fill the seal gap in sufficient quantity. In this case one or a plurality of reservoirs may be disposed at regular intervals, so that it is ensured that a uniform distribution of the plastic sealant mass is achieved.

A further possibility is to provide a larger central reservoir filled with sealant mass and connected with a plurality of ducts through which the plastic sealant mass can pass to the various areas of the seal gap.

It is favourable for dimensioning the openings to provide a gap width in the region of 0.2–3 mm, through which the plastic sealant mass can emerge. In this respect the depth of the opening in the area may be a maximum of 1 mm, corresponding more or less to the thickness of a layer of a multi-layer gasket.

It is advantageous to provide at the opening at least one flexible lip, which at least partly up to entirely covers the outlet of the opening and through which, upon exertion of a pressure on the raised point in the region of the reservoir or reservoirs, the plastic sealant mass can emerge due to slight movement of the flexible lip and at the moment at which the pressure on the reservoir is reduced, the flexible lip moves back and prevents backflow of the plastic sealant mass. Moreover the lip counteracts an undesired emergence of the plastic sealant mass during transport and storage.

There may be preferably used as a plastic paste-like sealant mass a polyurethane mixture which is plastic at least up to a temperature of 200° C. It should have a plasticity of 100 to 500 according to ASTM D 926 at ambient temperature.

The cylinder head gasket according to the invention can be produced in a form in which punched-out areas of corresponding dimensions are produced in the respective layer(s) during manufacture, predetermining the position and size of the openings and of the reservoir(s). In conjunction therewith, in the case of multi-layer gaskets, various layers are placed one above the other, connected together, and the plastic and paste-like sealant mass is inserted for example by locally defined rolling-in, injection, impressing, for example of cord-shaped sealant mass or with excess pressure among other things. In a final working step, a cover layer may be applied to the upper side of the cylinder head gasket, which forms a raised portion in the region of the reservoir and surrounds the plastic and paste-like sealant mass. In this respect the cover layer must have sufficient elasticity, and be able to yield from above when pressure is applied, in order to press the plastic sealant mass through the openings into the seal gap. In addition to metal layers, sufficiently heat-resistant plastics or paints can be used as a cover layer. The openings may be temporarily closed with thin films or by a cast skin of the coating material (an appropriate polymer material) forming during coating of the metal seal in the region of the openings. In this respect the films used may tear open during assembly and the sealant mass may emerge through the tear, or removable films may be used.

Insertion of the plastic sealant mass may however be undertaken with draw nipples or using vacuum into the cavities forming the openings and reservoirs.

In the case of single-layer gaskets it is advantageous to produce the openings and the reservoir or reservoirs by impressing a groove. After impression of the groove, the plastic sealant mass may preferably be inserted and in conjunction therewith the edges of the impressed groove may be compressed. In this case the inner region of the impressed groove forms an elongate reservoir, and the compressed edges are in a corresponding size the openings through which the plastic sealant mass emerges and can seal off the sealing gap when pressure is applied from above on to the cylinder head gasket.

The plastic and paste-like sealant mass may be processed in the form of a cord or also in encapsulated form, i.e. surrounded on all sides by a thin layer. In this respect the thin layer may also consist of a gel.

The invention will now be described in more detail with reference to embodiments given by way of example.

Figure 1A:
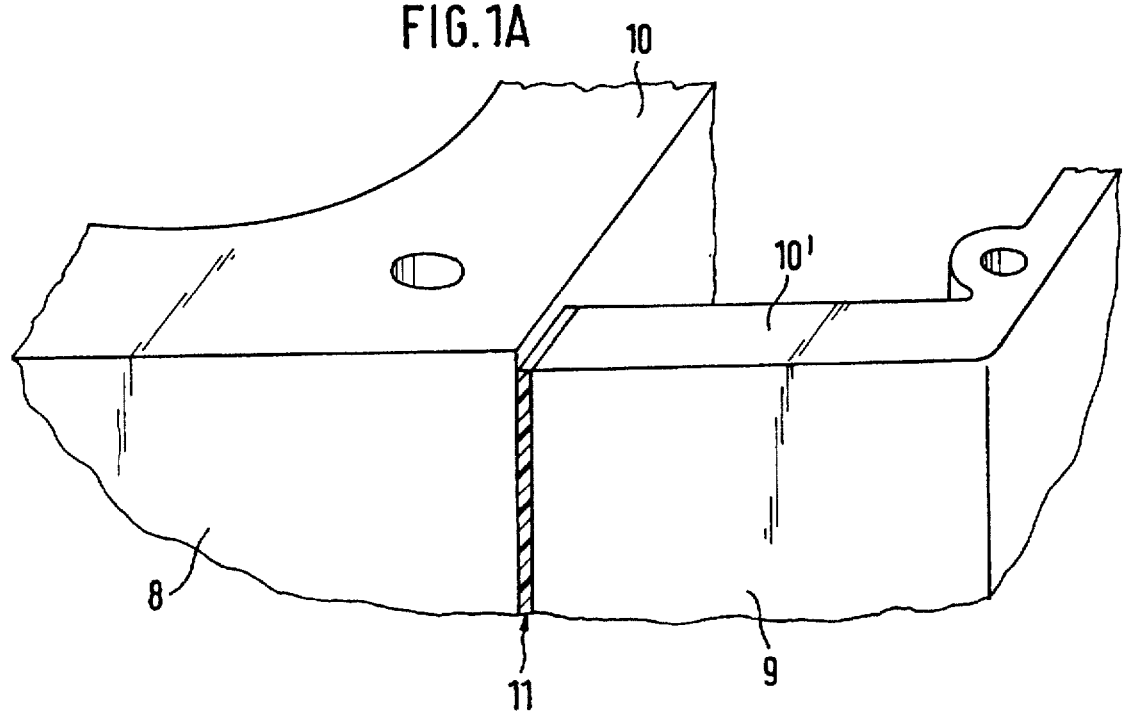
Figure 2:
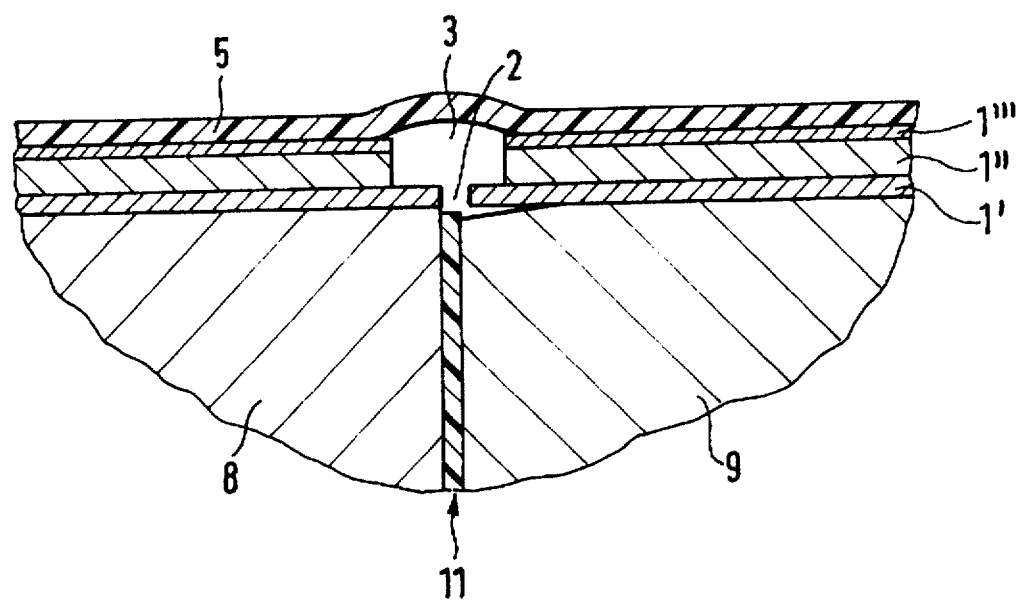
Figure 3A:
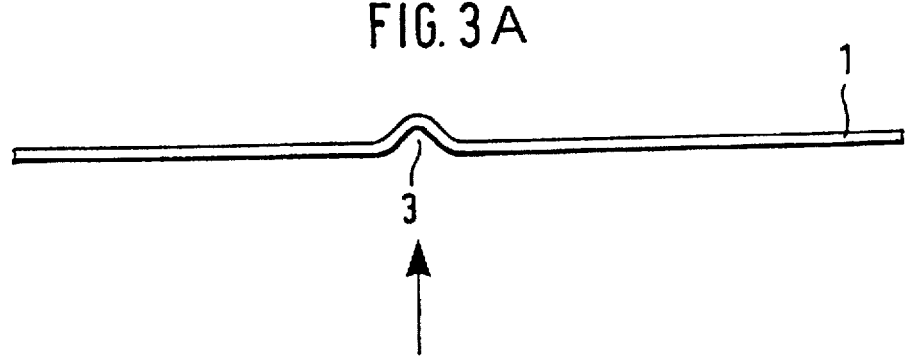
Figure 3B:
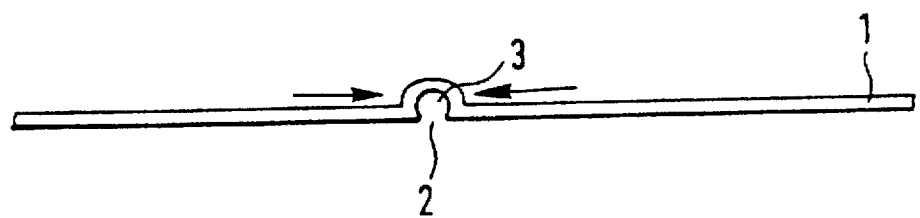
Figure 4:
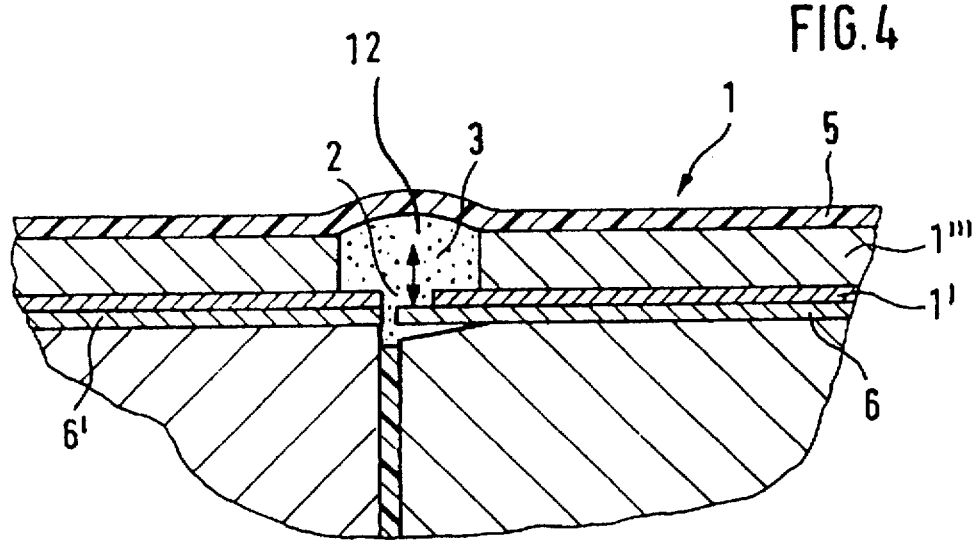
Figure 5:
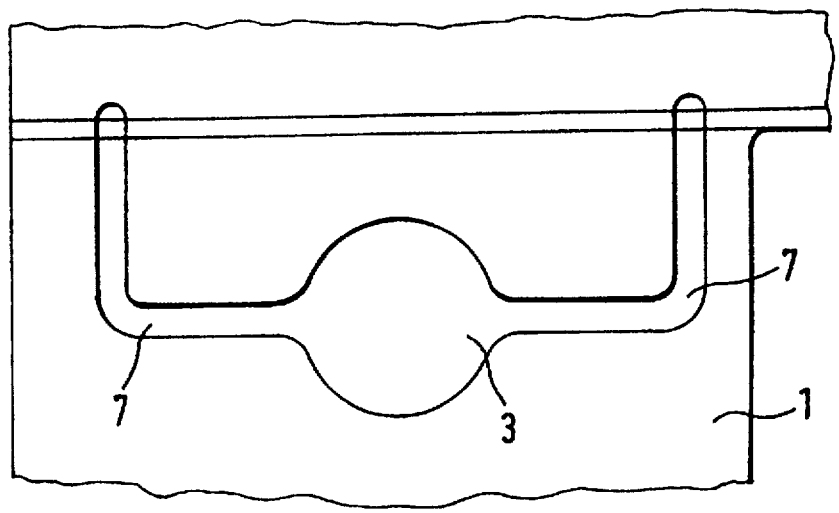
Figure 6:
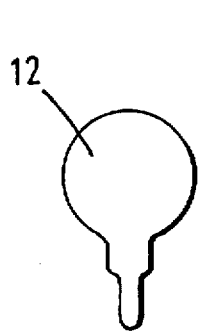

In this case there are shown:

FIG. 1: a diagrammatic view of a housing for the timing gear drive, flanged on to an engine block;

FIG. 1a: detail from FIG. 1 with the critical area between engine block and housing;

FIG. 2: a partial cross sectional view through a multi-layer metallic cylinder head gasket;

FIGS. 3A and 3B: a partial cross sectional view of a single-layer metal cylinder head gasket during different production steps;

FIG. 4: a cross sectional view through a multi-layer metal cylinder head gasket in an improved embodiment;

FIG. 5: a partial plan view of a cylinder head gasket with central reservoir, and FIG. 6: a shape predetermined by a reservoir and an opening, of plastic sealant mass accommodated therein.

Figure 7:
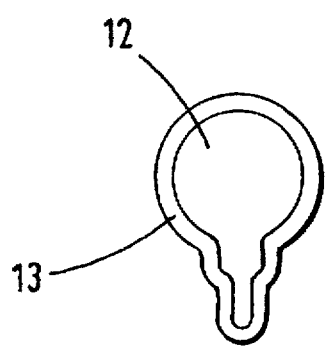

FIG. 7: an encapsulated plastic sealant mass.

FIG. 1 is a diagrammatic view of an engine block 8, upon which there is flanged a housing 9 for the timing gear drive, and which is to be sealed in common with the engine block 8 in the direction of the cylinder head (not shown), with a cylinder head gasket likewise not shown. In this respect the particularly critical wall area for the seal is shown in FIG. 1a between engine block 8 and housing 9 in detail. The cylinder head gasket (not shown) is aligned towards the seal surfaces 10, 10', and the critical area is that above the front cover seal 11 in the seal gap between engine block 8 and housing 9. This area is extended to the right and shown in a cross-sectional view from which it is apparent how a plastic and paste-like sealant mass fills and laterally surrounds the seal gap.

Partly illustrated in FIG. 2 is a multi-layer metal cylinder head gasket 1, the two lowermost layers 1' and 1", forming an opening 2 for the emergence of the plastic sealant mass into the seal gap. In a third position 1'" located above the two lower layers 1' and 1", a larger area is released, which forms a reservoir 3 for accommodating plastic and paste-like sealant mass. Above the upper layer 1'" and above the reservoir 3 is a cover layer 5 which can likewise be formed from metal or from another partly resilient material such as plastic or a heat-resistant paint. The quantity of plastic sealant mass housed in the reservoir 3 is in this case so calculated that a sufficient seal of the seal gap is guaranteed and on the other hand a raised portion is formed which projects above the upper plane of the cylinder head gasket. This ensures that, during assembly of the cylinder head (not shown), pressure is exerted on the plastic sealant mass housed in the reservoir 3 and a defined quantity of the plastic sealant mass is pressed through the narrow outlet of opening 2 into the seal gap and fills it.

A single-layer metal cylinder head gasket 1 is shown in FIGS. 3A and 3B. This is produced in such a way that a groove is impressed by a stamp in the direction of the vertical arrow into the cylinder head gasket 1 (FIG. 3A) and then force is exerted in the direction of the horizontal arrows on the material of the cylinder head gasket 1, so that the reservoir 3 and the opening 2 are formed (FIG. 3B). In this view, the plastic sealant mass has been omitted, which however, preferably before exertion of the force in the horizontal direction is inserted into the groove, which subsequently forms the reservoir 3. A conventional rolling-in process can be used for this purpose. During assembly of cylinder head gasket 1 and the cylinder head, the latter exerts a pressure on the reservoir 3 and the plastic sealant mass is pressed in the form already described out of the reservoir 3 through the opening 2 into the seal gap, and fills the latter in a sealed manner.

An advantageous design of a multi-layer metal cylinder head gasket is to be seen from FIG. 4. In this case the metal layers 1, 1' and 1'" form an opening 2 and the reservoir 3. The lowermost layer 6, 6' of the cylinder head gasket 1 is slotted in the region of the opening 2. In this case at least the portion of the lowest layer 6 is resilient in form and can yield in the direction of the double arrow. If as already described pressure is exerted from above on the plastic sealant mass 12 (dotted), this latter is pressed through the opening and the portion of the lowest layer 6 is thereby pushed downwards and a larger cross-section is released. If the pressure is released, or no further pressure is exerted on the plastic sealant mass, the lowest layer 6 pivots back into the initial position and thus prevents back-flow of the plastic sealant mass, so that the sealing behaviour is improved.

In the view according to FIG. 5 the portion of the cylinder head gasket is shown which covers the area of the flanged-on housing portion, in a plan view. In this case a central, relatively large-volume reservoir 3 is provided, which communicates via ducts 7 with the corresponding opening 2 not visible in this view. Thus the reservoir 3 and the ducts 7 are of such dimensions that uniform distribution of the plastic sealant mass to the corresponding seal gaps to be sealed is ensured. It may also be favourable to arrange a plurality of reservoirs 3 at regular intervals, in order to ensure uniform distribution of the plastic sealant mass in the seal gaps. The latter embodiment is improved in comparison to the first described embodiment in that the dead spaces present are smaller and thus the required amount of plastic sealant mass is reduced.

FIG. 6 shows the shape of the plastic sealant mass 12, dictated by the reservoir 3 and the opening 2, which is accommodated in the metal cylinder head gasket 1. Here it is clearly visible that in the region of the opening 2, due to the constriction formed thereby, only a relatively small quantity of plastic and paste-like sealant mass can be pressed, leading to a situation in which no air inclusions are contained and uniform outflow of the plastic sealant mass from the opening 2 is ensured, and thus a uniform distribution of the plastic sealant mass is achieved in the seal gap. FIG. 7 shows the sealant mass 12 according to FIG. 6 encapsulated by a coating 13.

We claim:

1. A cylinder head gasket for internal combustion engines with at least one component flanged laterally on to at least one of an engine block and a cylinder head, comprising:

at least one metallic gasket layer;

at least one reservoir formed in the cylinder head gasket and communicating with the at least one metallic gasket layer;

a plastic paste-like sealant mass accommodated in the at least one reservoir; and at least one outlet opening in fluid communication with the at least one reservoir, the opening being disposed in a region of a gap between the at least one flanged-on component and at least one of the engine block and cylinder head such that as pressure is exerted on the cylinder head gasket the plastic paste-like sealing mass is forced to flow out of the at least one reservoir through the at least one opening in order to fill the gap.

2. The cylinder head gasket according to claim 1, wherein the cylinder head gasket is beaded in cross-section in the region of the at least one reservoir.

3. The cylinder head gasket according to claim 1, wherein the at least one opening is adapted in shape and size to the gap to be sealed.

4. The cylinder head gasket according to claim 1, wherein the at least one opening is designed in a duct form.

5. The cylinder head gasket according to claim 1, wherein the plastic paste-like sealant mass has a plasticity of 100 to 500 according to ASTM D 926 at ambient temperature.

6. The cylinder head gasket according to claim 1, wherein the plastic paste-like sealant mass is a polyurethane mixture which is plastic up to at least 200° C.

7. The cylinder head gasket according to claim 1, wherein the at least one opening has a width of approximately 0.2–3 mm.

8. The cylinder head gasket according to claim 1, wherein the at least one opening is covered with a film.

9. The cylinder head gasket according to claim 1, wherein the at least one opening is covered with a cast skin consisting of a seal covering material.

10. The cylinder head gasket according to claim 1, wherein a flexible lip which partly or entirely covers the at least one opening is attached to the at least one opening.

11. The cylinder head gasket according to claim 1, wherein the at least one reservoir is a central reservoir which is connected via ducts with the at least one opening.

12. A method of producing a cylinder head gasket comprising:

punching at least one reservoir and at least one opening in at least one metallic gasket layer;

inserting a plastic paste-like sealing mass into the at least one reservoir; and applying a final cover layer to a side of the at least one metallic gasket layer which is opposite to the at least one opening.

13. A method of producing a cylinder head gasket comprising:

stamping at least one groove in at least one metallic gasket layer, the one or more grooves forming one or more reservoirs;

inserting a plastic paste-like sealing mass into the at least one groove; and compressing the edges of the at least one groove to form the at least one opening.

14. The method according to claim 12 or 13, wherein the plastic paste-like sealant mass is inserted into the at least one reservoir by a pressure difference.

15. The method according to claim 12 or 13, wherein the plastic paste-like sealing mass is pressed into the at least one reservoir.

16. The method according to claim 12 or 13, wherein the plastic paste-like sealant mass is processed in form of a roll.

17. The method according to claim 12 or 13, wherein the plastic paste-like sealing mass is processed in an encapsulated form.

18. A cylinder head gasket for internal combustion engines with at least one component flanged laterally on to at least one of an engine block and a cylinder head, comprising:

at least one metallic gasket layer;

at least one reservoir formed in the cylinder head gasket and communicating with the at least one metallic gasket layer;

a plastic paste-like sealing mass accommodated in the at least one reservoir;

at least one outlet opening disposed in fluid communication with the at least one reservoir, the opening being disposed in a region of a gap between the at least one flanged-on component and at least one of the engine block and cylinder head such that as pressure is exerted on the cylinder head gasket the plastic paste-like sealing mass is forced to flow out of the at least one reservoir through the least one opening in order to fill the gap; and at least one lip arranged in a flow path of the plastic paste-like sealing mass between the reservoir and the gap, the at least one lip partly or entirely covering the at least one opening, the lip imposing no or only a slight flow resistance when the plastic paste-like sealing mass flows out through the at least one opening and preventing backflow of the plastic paste-like sealing mass when the pressure is reduced.

19. The cylinder head gasket according to claim 18, wherein the at least one reservoir is connected via ducts with the at least one opening.

20. The cylinder head gasket according to claim 18, wherein the cylinder head gasket is beaded in cross-section in the region of the at least one reservoir.

21. A cylinder head gasket for internal combustion engines with at least one component flanged laterally on to at least one of an engine block and a cylinder head, comprising:

at least one metallic gasket layer;

at least one reservoir formed in the cylinder head gasket and communicating with the at least one metallic gasket layer, the reservoir having an upper and a lower wall with respect to the installed cylinder head gasket, the lower wall having at least one outlet and the upper wall having a portion that is beaded in cross-section;

a plastic paste-like sealing mass accommodated in the at least one reservoir; and at least one outlet opening in fluid communication with the at least one outlet of the at least one reservoir, the opening being disposed in a region of a gap between the at least one flanged-on component and at least one of the engine block and cylinder head such that as pressure is exerted on the beaded portion the plastic paste-like sealing mass is forced to flow out of the at least one reservoir through the at least one opening in order to fill the gap.

22. The cylinder head gasket according to claim 21, wherein the at least one reservoir is a central reservoir which is connected via ducts with the at least one opening.

* * * * *